Oct. 20, 1925.
J. J. MASCUCH
1,557,719
AUTOMOBILE BUMPER
Filed Nov. 7, 1924
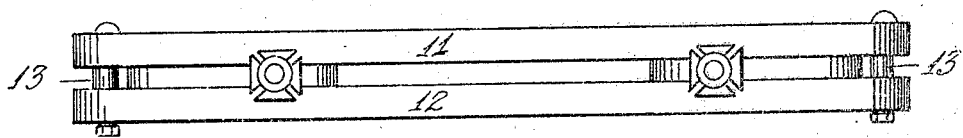
Fig.1
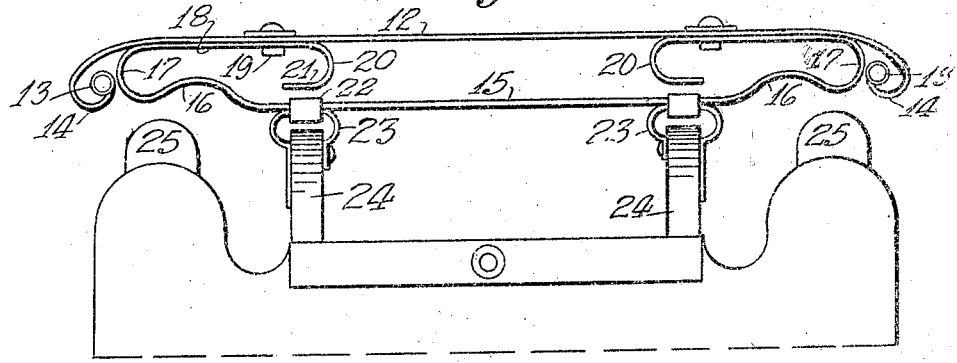
Fig.2
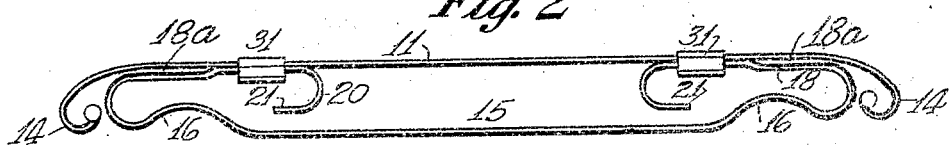
Fig.3
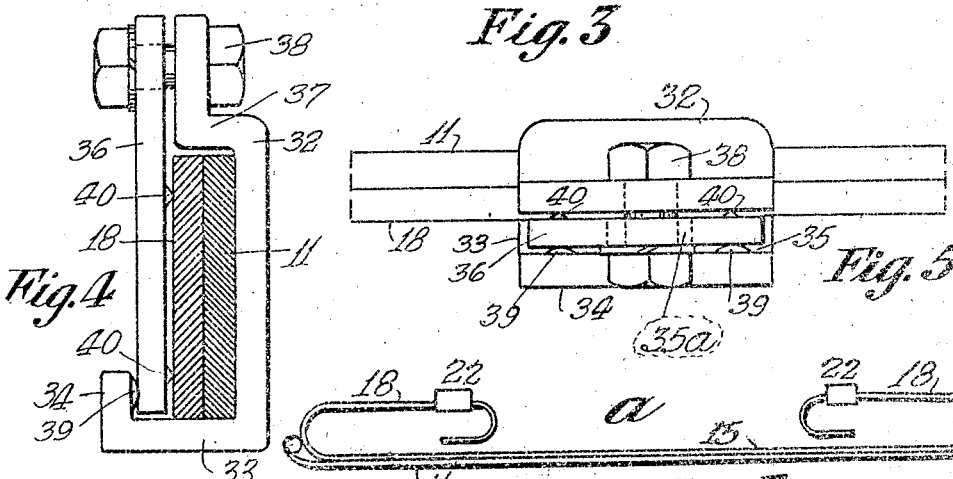
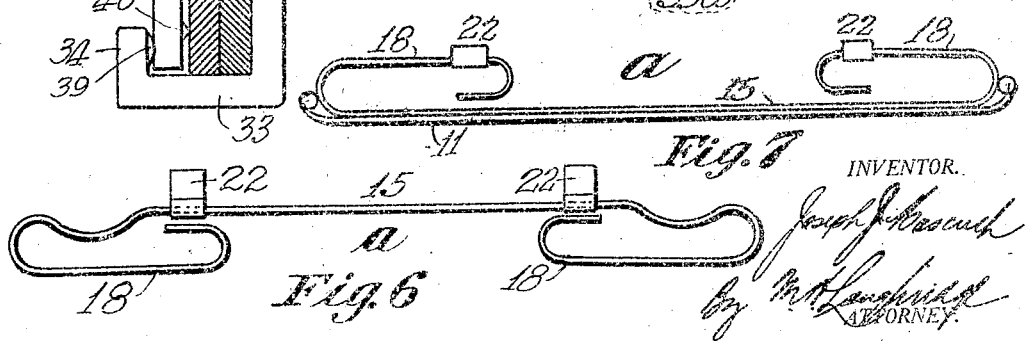
INVENTOR.
Joseph J. Mascuch
by M. Langridge
ATTORNEY.

Patented Oct. 20, 1925.

1,557,719

UNITED STATES PATENT OFFICE.

JOSEPH J. MASCUCH, OF EAST ORANGE, NEW JERSE

AUTOMOBILE BUMPER.

Application filed November 7, 1924. Serial No. 748,351.

*To all whom it may concern:*

Be it known that I, JOSEPH J. MASCUCH, a citizen of the United States, and resident of East Orange, in the county of Essex and State of New Jersey, have invented certain new and useful Improvements in Automobile Bumpers, of which the following is a specification.

This invention relates to automobile bumpers and has for an object to provide a bumper which is resilient and capable of withstanding substantial shocks, also a bumper that is attractive in appearance, simple in construction and easily assembled. These and other objects of the invention will be more particularly understood from the following specification and the accompanying drawings, in which, Fig. 1, is a front elevation of a double bar bumper constructed according to my invention, Fig. 2 is a plan view of the bumper in place on an automobile, Fig. 3, is a plan view of a single bar bumper embodying my invention, Figs. 4 and 5 are details of the construction, Fig. 6 is a modification showing how the rear member of the bumper may be used by itself as a rear bumper with a space between the ends for spare tires, and Fig. 7 is another modification for a rear bumper.

The bumper in the present invention is of the spring bar type arranged transversely in front or rear of the vehicle and clamped to the chassis frame. The ends of the bumper extend beyond the wheels and the fenders so as to form a guard in front of the car. The bumper comprises an impact member with a rear supporting member which is bent forward at the ends to engage the impact member and the ends are extended in the form of loops which, upon compression engage the rear member forming shock absorbers. The space between the front and rear members is comparatively narrow so as to reduce the overhanging weight of the bumper and reduce vibration, this construction also brings the bumper within a narrow clearance at the ends of the vehicle.

Referring to the drawings, 11 and 12 are the impact members as shown in Fig. 1 of a double bar type bumper. These members are bent backwards and inwards at the ends as indicated at 14 and are secured together in vertical parallel relation by end posts and spacers as indicated at 13.

The rear supporting member comprises a single bar 15 secured by clamps 22 and brackets 23 to the side members 24 of the chassis frame. The bar 15 is dented as indicated at 16 to clear the wheel 25 and is then bent forward in the loop 17, extending inwardly parallel to the impact bars to which it is clamped at 19 and the end is finally bent as shown at 20 in the form of a C spring with the projecting end 21 parallel with the clamp 22 but normally spaced therefrom. The bumper is symmetrical about the centre line of the car both ends being formed alike.

It will be noted that the impact bars 11 and 12 are secured to the supporting bar at 19 and beyond this point the impact bars act as a cantilever. However, the parallel section 18 of the rear bar reinforces the cantilevered portion of the impact bars while the bends 16 and 17 form a resilient support for the impact bars. As the impact bars are compressed the ends of the C springs 21 engage the clamp 22 of the supporting bracket and act as shock absorbers. Attention is called to the fact that the bend 17 rounds out the rear bar 15 to align with the turned over end 14 of the impact bars thus preventing the ends 14 from "hooking" on objects when backing up or turning to the side.

The bumper in Fig. 3 is similar in contour to Fig. 2, but this bumper is provided with a single impact bar 11 which is clamped at 31 to the rear supporting bar.

One form of clamp that may be used with this invention is shown in Figs. 4 and 5. The impact bar 11 and the reinforcing bar 18 are shown in section in the shackle 32 which has a bent over base 33 upon which these bars rest, and an upwardly extending lug 34 upon which raised pads 39 extending inwardly may be provided. The upper end of this shackle is bent forward at 37 extending over the bars 11 and 18 and provided with the bolt 38.

The clamping plate 36 may be provided with an upper row of points 40 and a lower row of points 40 as shown. This plate is driven sideways into the groove 35 which is constructed with a slight taper so that the plate tightens against the pads 39 and the lower row of points 40. A slotted hole 35ª is provided for the bolt 38 which tightly clamps 36 to the shackle 37 and brings the upper row of points 40 to bear against the bar 18. The points 40 indent bar 18 so that the clamp cannot slide from its position.

The form of clamp shown in Figs. 4 and 5 is quickly assembled, requires only one bolt and does not form an obstruction on the face of the impact bar.

The rear bar 15 is shown and described as made from one piece of bar stock. However, the end portions up to the clamp can be made of separate pieces which are interchangeable and these pieces may be connected by a straight bar between the clamps.

In Fig. 6 an application is shown of the rear bar only used by itself as a rear bumper. In this case the bar is secured by the clamps 22 and the surfaces 18 act as impact members while the space between the ends indicated by a leaves room for the spare tires usually carried on the rear of a car.

The rear bumper in Fig. 7 shows another combination in which the rear bar is reversed with the impact member secured to the opposite side thereof. The attaching clamps 22 are secured to the looped ends 18 and the impact member 11 is secured to the bar 15. This leaves the space a for the tires similar to Fig. 6.

In Fig. 3 it will be noted that a space 18ª is provided between the looped end 18 and the impact bar 11. This space prevents rattling between the spring members of light weight bumpers.

Having thus described my invention, I claim:

1. In a bumper of the class described, the combination of an impact member with its ends bent backwards in curves, a rear supporting bar parallel with and spaced from said impact member, said bar clamped against said impact member at points intermediate its ends and each end of said bar formed in a double C spring spaced from and in the plane of the supporting bar and means for clamping said bar to a vehicle frame.

2. In a bumper of the class described, the combination of an impact member, a rear supporting bar parallel with and spaced from said impact member, said bar clamped against said impact member at points intermediate its ends and each end of said bar formed in C springs, clamps for securing said supporting bar to a vehicle frame, said C springs arranged, upon compression of the impact member, to engage with said clamps.

3. In a bumper of the class described, the combination of an impact member with its ends bent backwards in curves, a rear supporting bar parallel with and spaced from said impact member with its ends bent forward in return curves of substantially the same width as the curves of the impact member and having each end formed in a C spring in the plane of said impact member, said supporting bar forming a reinforcing member for the ends of the impact member and clamped to the impact member at points intermediate its ends.

4. In a bumper of the class described, the combination of an impact member with its ends curving backwards, a rear supporting bar spaced parallel with said impact member and clamped to said impact member at points intermediate the ends of said impact member, each end of said bar beyond said clamps being formed in double reverse curves of substantially the same width as the curves of the impact member.

5. In a bumper of the class described, the combination of an impact member with its ends bent backwards in curves, a rear supporting bar parallel with and spaced from said impact member, said bar clamped against said impact member at points intermediate its ends, said clamping point being off-set on said bar substantially for the thickness of said bar so as to space said bar and member where they are adjacent to the clamping point and so that said member is reinforced by said bar after an initial deflection.

Signed at Wilkes-Barre, Pa., in the county of Luzerne and State of Penna. this 23rd day of October A. D. 1924.

JOSEPH J. MASCUCH.